Sept. 7, 1965   L. R. SRIGLEY   3,204,976
GOLF CART
Filed Sept. 26, 1963   4 Sheets-Sheet 1
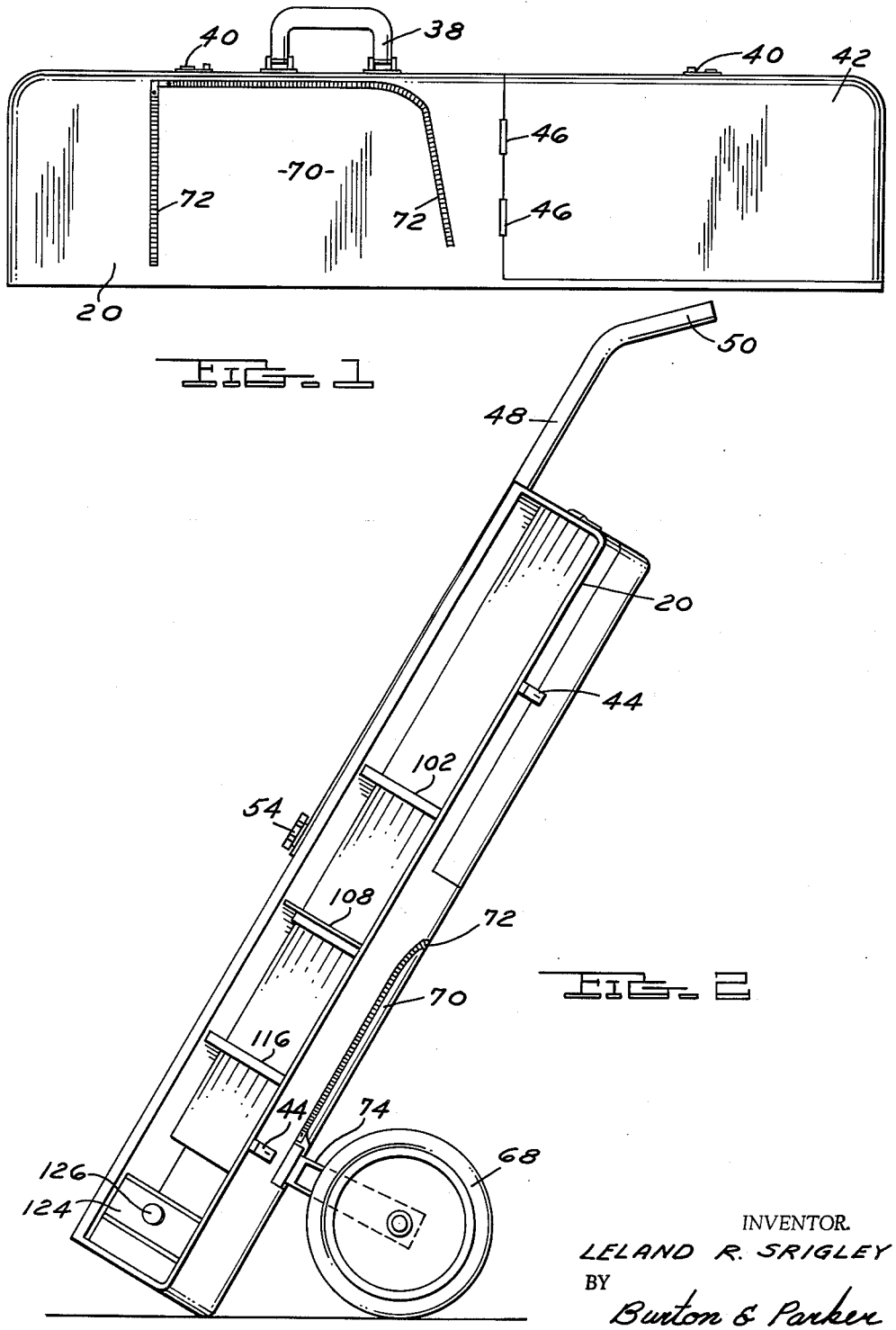
INVENTOR.
LELAND R. SRIGLEY
BY
Burton & Parker
ATTORNEYS

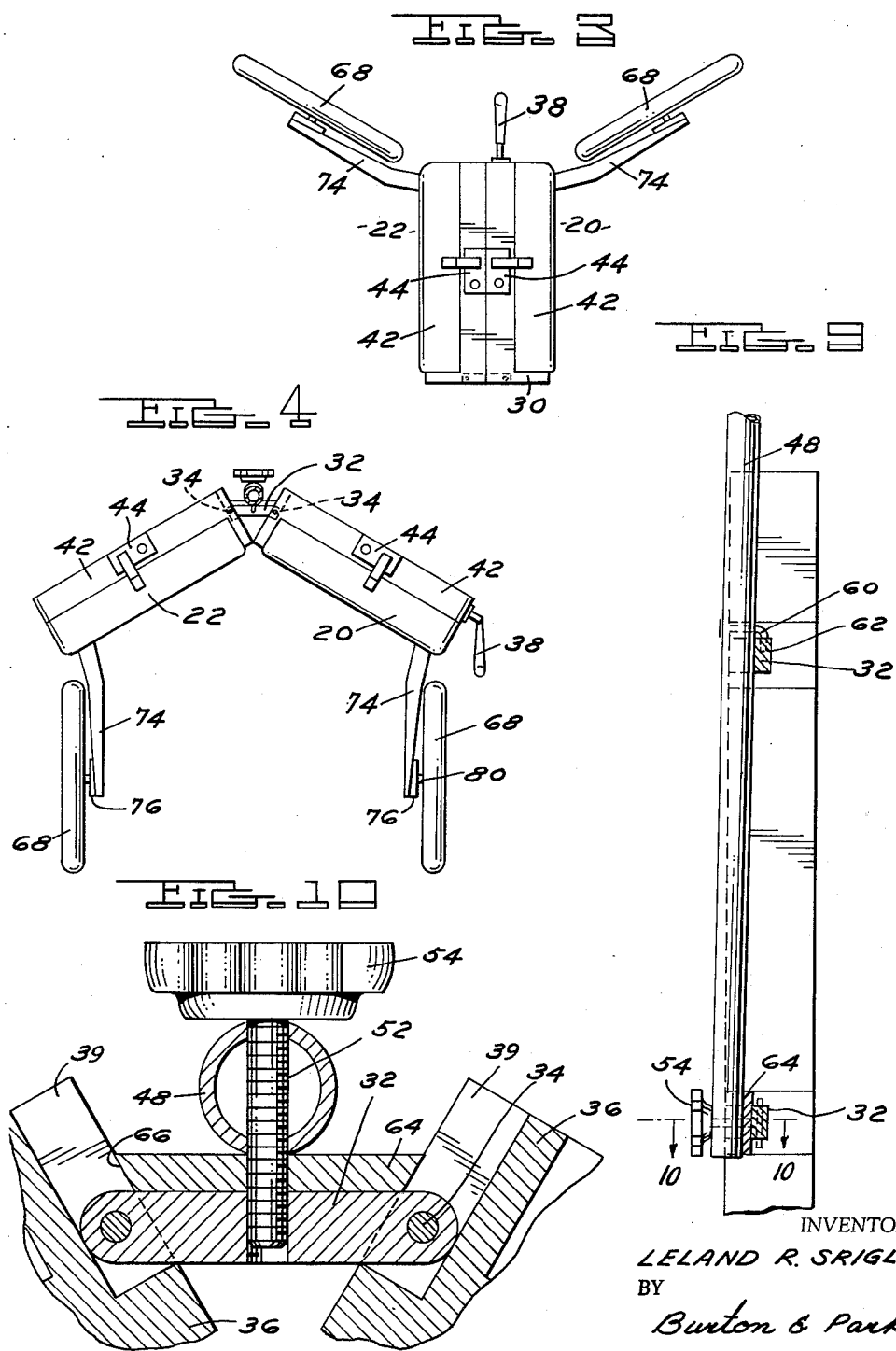

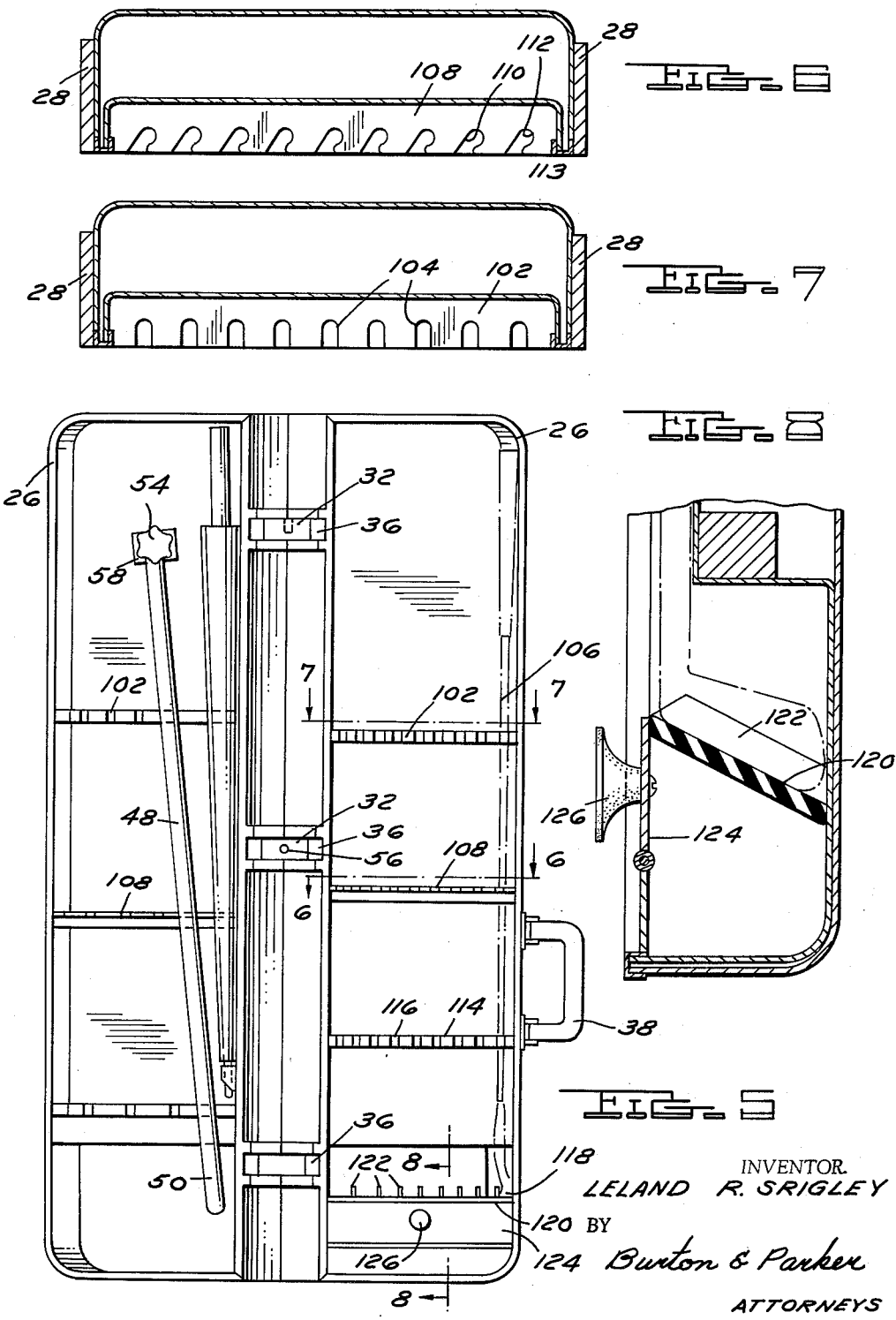

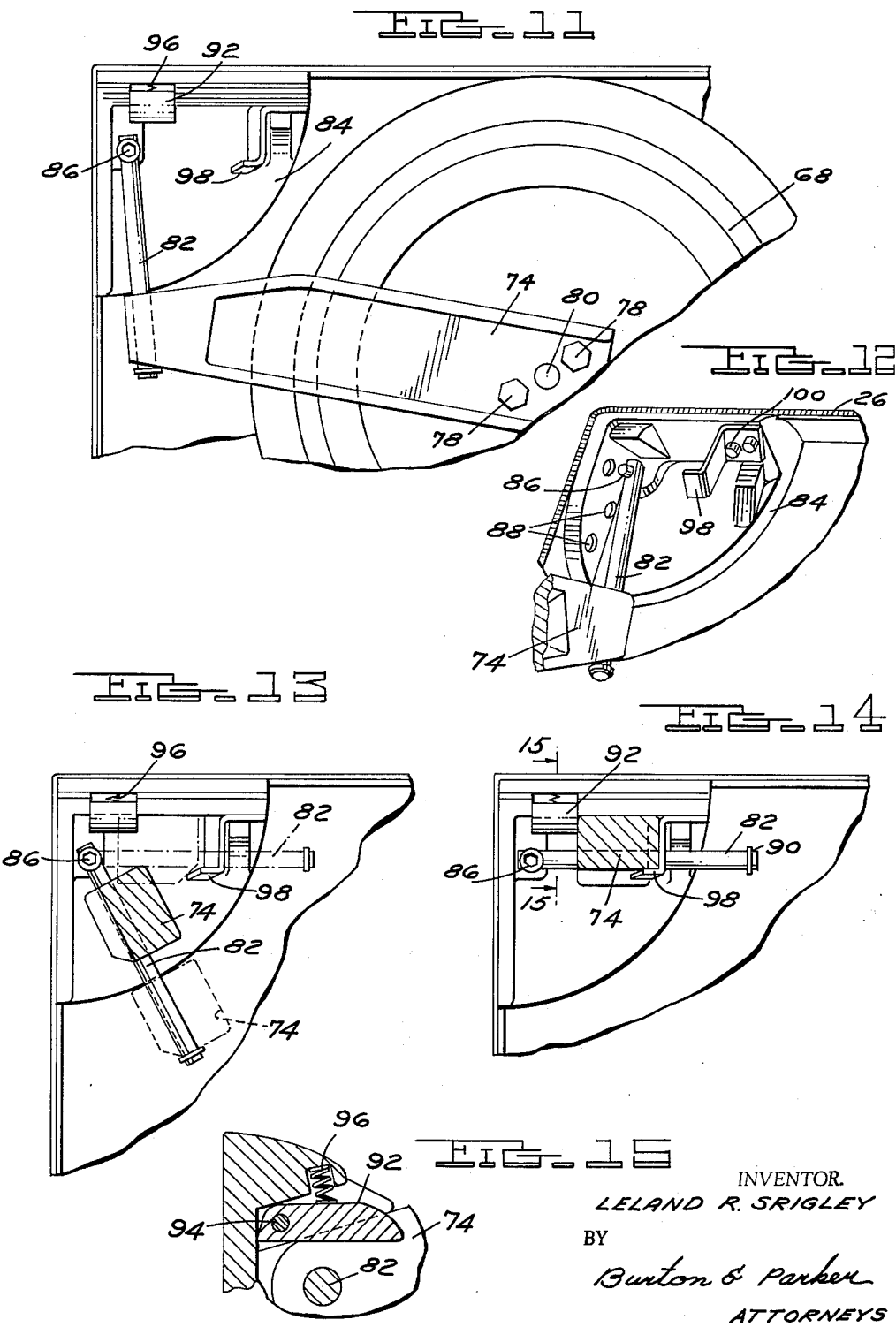

United States Patent Office 3,204,976
Patented Sept. 7, 1965

3,204,976
GOLF CART
Leland R. Srigley, 781 Westchester,
Grosse Pointe 30, Mich.
Filed Sept. 26, 1963, Ser. No. 311,755
12 Claims. (Cl. 280—37)

This invention relates to a combination golf equipment case and caddy cart, and more particularly to a carrying case for golf equipment which is convertible into a wheeled caddy cart for transporting the golf equipment about a golf course.

Traditionally, golf clubs have been carried about the golf course by the player or a caddy in bags provided with a shoulder strap so that the bag can be slung over the shoulder of the person carrying it. In recent years so-called caddy carts have come into widespread usage. The most widely accepted type of such caddy cart is a two wheeled device having a frame to which a conventional golf club bag is secured as by straps, with a handle attached to the frame for pulling the cart around the course. While most of these carts are collapsible to a degree, they are nevertheless cumbersome and difficult to handle, especially when they must be loaded into an automobile trunk or the like for transportation to and from the golf course.

An object is the provision of a golf club carrying case and wheeled cart wherein the case comprises two complementary hinged sections each of which is provided interiorly with golf club supporting brackets and which two sections are hinged together to be folded to the closed position providing a case to be carried, and are adapted to be swung apart to an open position, preferably in excess of 180°, whereby the interiors of the sections are so disposed at an angle with respect to each other that the clubs are readily accessible.

Another object is the provision of a golf club carrying case and cart of the character described wherein each section of the case is provided with a wheel assembly which may be folded into inoperative position within a compartment in the section or unfolded to an operative position projecting outwardly from the section when the sections are spread apart. The case and golf cart also include a handle which may be removably disposed within the case when closed and which is receivable between the two sections of the case overlying the hinge mechanism when the sections are spread apart, and which handle is adapted to be secured in position between the two sections to be used as a handle to wheel the case and as a part of means adapted to hold the case sections in the spread apart position.

The wheel assembly is of an improved character wherein a ground engaging wheel is rotatably mounted upon one end of a support therefor and the opposite end of such support is slidably received upon an axle shaft which has one end pivoted to a bracket within the compartment of the case section whereby the wheel support may be slidably shifted over the axle shaft and rotated thereabout to permit movement of the wheel between an operable ground engaging position and an inoperative folded position within the compartment. Means is also provided to lock the wheel in each operable position and to retain the wheel within the compartment in the operative position.

The construction of the case sections is also such that a plurality of compartments are provided as for golf equipment or other articles. One of these compartments is located at one end of its case section beyond the ends of the clubs carried therein. The clubs are so mounted within the case sections that they may be releasably sprung into position to releasably retain their place within the case sections against accidental displacement.

Other objects, advantages and meritorious features will more fully appear from the following specification, claims, and accompanying drawings, wherein:

FIG. 1 is a side elevation of a combination carrying case and caddy cart embodying my invention showing the case in closed position with the golf clubs, cart wheels and handle, and other equipment completely enclosed within the case for carrying to and from the golf course;

FIG. 2 is a side elevation of the device shown in FIG. 1 with the case opened to expose the golf clubs for easy access and with the wheels and handle in operative position for movement over the terrain of a golf course;

FIG. 3 is an end elevation of the device of FIGS. 1 and 2 showing the carrying case in closed position with the wheels swung to their operative position;

FIG. 4 is an end elevation of the case shown in FIG. 3 but showing the carrying case with the complementary sections spread apart and held in the open position with the handle attached;

FIG. 5 is a front elevation of the carrying case in open position showing the storage arrangement for various golf equipment including the mounting brackets for the golf clubs;

FIG. 6 is a cross-sectional view taken along line 6—6 of FIG. 5 showing one set of club mounting brackets;

FIG. 7 is a cross sectional view taken along line 7—7 of FIG. 5 showing another set of club mounting brackets;

FIG. 8 is a cross-sectional view taken along line 8—8 of FIG. 5 showing the inclined wall for supporting the club heads and a compartment for equipment such as golf balls, tees, and the like;

FIG. 9 is a longitudinal sectional view through two of the three hinge mechanisms which join the two halves of the carrying case showing the manner in which the handle is mounted in operative position on these hinge members;

FIG. 10 is an enlarged cross-sectional view through one hinge mechanism joining the case halves showing the handle attached to such hinge mechanism with means on the handle for retaining the case in open position, and taken on line 10—10 of FIG. 9;

FIG. 11 is a partial side elevation of the carrying case showing one of the wheel assemblies folded to its inoperative position within the case;

FIG. 12 is a perspective view of the wheel assembly of FIG. 11 showing the wheel supporting structure in one position of movement between its operative and inoperative positions;

FIG. 13 is a partial side elevation similar to FIG. 11 showing the wheel supporting structure in another position of such movement;

FIG. 14 is a view similar to FIG. 13 showing the wheel supporting structure locked in operative position; and FIG. 15 is a partial cross-sectional view of the wheel supporting structure taken along line 15—15 of FIG. 14 showing the wheel locking mechanism.

My improved case and golf cart is shown in the closed position in FIG. 1. It is shown in side elevation in the closed position in FIG. 1. It is shown in the open and spread apart position of use in FIG. 2. The case comprises a pair of complementary halves or sections indicated as 20 and 22 in FIGS. 1 through 4. Each of these complementary halves includes a frame which may be formed of metal or the like and is indicated as 26 and has associated therewith a wall portion which may be formed of plastic fiberboard or any suitable material such as is used in the fabrication of luggage. A side wall reinforcement 28 is shown as associated with each of the long sides of the two sections most clearly in FIGS. 6, 7, and 8.

These two complementary sections are swingably connected together by three spaced apart hinge assemblies indicated generally as 30 in FIG. 3. Each hinge assembly comprises a rigid metal link 32, FIGS. 4, 5, and 10. Opposite ends of this link are pivoted as at 34 by a pin to a metal plate 36 which is secured to and extends across the depth of the half section. The pivotal connection is best shown in FIGS. 4 and 10. It will be seen that each plate is cut away as at 39 to permit the link 32 to be seated therein when the two complementary sections are folded together as shown in FIGS. 1 and 3.

A handle 38 is secured to one of the sections for carrying the case when closed. Suitable locks 40 are provided to secure the two complementary sections together in the closed position. Exteriorly, each section is provided with a swingable wall panel or tray-like portion 42 which is provided with a lock assembly 44 whereby it may be secured to the main portion of the casing and it provides a compartment within which clothing or the like may be placed for storage. This panel may be hinged as at 46 to the section to which it is secured. These two tray-like portions 42 may be disassembled at the hinges and secured together to form a case which might be carried separately and used for clothes or the like.

There is a handle element indicated as 48 which may be formed of metal tubing or the like and which is provided at one end with a hand grip portion 50 as shown in FIG. 2 and is provided adjacent to the opposite end with a securing bolt 52 which extends through the handle 48 as shown in FIG. 10, and which has a hand grip part 54 as shown in FIG. 10. The threaded portion of this bolt is shown in FIG. 10 as extending through a threaded opening in the hinge link 32 as shown in FIGS. 2 and 5. It is the central link of the hinge elements that is provided with this threaded opening 56. This handle may be normally carried when the case is closed within the casing as shown in FIG. 5, and the securing bolt 52 attached to a plate 58 provided on the interior of the case and the handle itself disposed within supporting racks within the interior of the case as hereinafter described.

When the case is opened up for use and the two complementary sections are swung to the spread apart position as shown in FIGS. 4 and 5, the handle may be disposed overlying the hinge elements between the two case sections as shown particularly in FIGS. 2, 9, and 10. FIG. 9 shows the handle provided with a positioning pin 60 which is received within a socket 62 formed in the upper hinge link 32 and then the pin 52 is threaded down into the intermediate hinge link 32 which it overlies. This is shown particularly in FIG. 10.

There is mounted upon the handle a plate 64 which plate has beveled ends 66 that bear against the stationary plates 36 that are secured to the two case sections as shown in FIG. 10. This plate 64 is rigidly attached to the handle 52 but has an unthreaded aperture therethrough through which the pin 52 may extend freely. The aperture in the link 32 is threaded so that the pin 52 when tightened draws the plate 64 down against the two stationary end plates 36 of the hinge assembly bridging the cut out opening 38 through the stationary hinge plates 36. This plate 64 when the bolt 52 is tightened as heretofore described holds the two complementary case sections 20 and 22 spread apart as shown in FIG. 4. In this position these two complementary sections are spread apart approximately 240° as shown in FIG. 4 so that the interior faces of both sections which carry the clubs, etc. are positioned so as to render the clubs carried thereby readily accessible. The handle, therefore, serves two purposes; it serves as a handle for the wheeling of the case as shown in FIG. 2, and its plate 64 serves to hold the two halves of the case spread apart.

The complete case when used as a cart is shown as provided with two ground wheels indicated as 68. These ground wheels are similar; one is carried by each case section. The construction of this wheel assembly is best shown in FIGS. 11 through 15, but the use thereof is best shown in FIGS. 2 and 4. Each wheel assembly is adapted to be folded up within the underside of its case section and held in such folded position by a flap portion 70 shown in FIGS. 1 and 2 which may be secured in connected position by a zipper 72 as shown in FIGS. 1 and 2.

Each ground wheel is mounted on the outer end of a support 74 as shown in FIGS. 4 and 11. This support has a reinforcing plate 76 secured to its outer end by threaded stud 78 and the support and plate carry an axle pin 80 upon which the wheel is supported for rotation.

The opposite end of this support 74 is slidably pivotally mounted upon an axle member 82 as best illustrated in FIGS. 11 through 14. This axle member has the end opposite the support 74 pivoted to a bracket or casting 84 by a pin 86 as shown in FIGS. 11 through 14. This bracket element 84 is perhaps best shown in the perspective view of FIG. 12 and is secured within one corner of the frame 26 as shown in FIG. 12 by pins or the like 88. The axle member 82 can swing about the pin 86 between the two positions shown in FIGS. 11 through 14. The support 74 can slide over the axle member 82 from the position shown in FIGS. 11 and 12 to that shown in FIGS. 13 and 14. There is a washer or other part indicated as 90 on the end of the axle member 82 to retain the support 74 thereon.

When the support 74 is moved slidably over the axle member 82 to the outer end thereof, such support and wheel carried thereby may be swung within the compartment in the case section to its position of non-use, and the flap 75 secured thereover. When the support 74 is moved slidably over the axle member 82 toward the pivoted end as shown in FIGS. 13 and 14, and the axle member swung to the position shown in dotted line in FIG. 13, the narrowed end of this support 74 may be pressed against the dog 92 which is pivoted as of 94 and which is held outwardly by a spring 96 so that such dog yields sufficiently to permit the narrowed end of the support 74 to be slid over the axle 82 to a position behind the Z-shaped retainer 98. This retainer is secured as by pins 100 to the casting 84. The dog 92 is then urged outwardly by its spring to the position shown in FIG. 14 and holds this support 74 within such retainer 98, and the support and its wheel then depend from the case section as shown in FIG. 4 and are in a position of use.

It is apparent, therefore, that the wheel assembly for each case section may be readily manipulated from a position of non-use within its compartment in the case section where it is concealed by the flap 70 as shown in FIG. 1 to a position of use such as shown in FIGS. 2 and 4 and at which position of use it is retained as hereinabove set forth.

The case interiorly is provided with a series of three racks or supports for golf clubs shown in FIGS. 5, 6, and 7. These racks each comprise a plate extended transversely across the interior of the case section and provided with notches to receive the handles of clubs. FIG. 7 shows a plate 102 secured within the section which plate has a series of cutouts or notches 104 adapted to receive the handle of a golf club indicated as 106 as shown in FIG. 5.

The intermediate plate is indicated as 108. It is shown in FIGS. 5 and 6. It has cutouts 110 which are provided with end portions 112 and projections 113. These projections 113 are offset somewhat laterally the cutouts 104 and 116 in plates 102 and 114 as shown in FIG. 6 so that when the club is moved to seat within the cutouts in the three plates, it is tensioned to be received in place, but is not under tension when in position. The rack indicated as 114 which engages the club handle adjacent to the head and is shown in FIG. 5 is similar generally to the rack 102 and is provided with straight cutouts 116 and receives that portion of the handle of the club adjacent to its head. The head of the club 118 may be seated within a pocket formed in the rack 120 which rack 120 has pockets formed by wall portions 122 extending thereacross. When the clubs are finally seated within these three racks, the cutouts are so arranged and formed that the club shafts are not under tension as above stated, but are tensioned during such movement into position so that the clubs are held securely in place. The space below the rack 120 has a lid portion 124 and is provided with a handle 126, and this lid may be lifted and various other articles of use such as golf balls, tees or the like, may be disposed therein.

What I claim is:

1. A combination golf cart and carrying case comprising a pair of complementary carrying case sections provided interiorly with golf club supporting brackets; hinge mechanism connecting the case sections together for swingable movement of the sections between a face-to-face closed position and a spread apart open position; a wheel assembly for each case section having a rotatably supported ground-engaging wheel, said wheel assembly coupled with its section to be swung between an inoperative position alongside of the section to an operative position projecting outwardly therefrom; and an elongate handle releasably secured to said hinge mechanism between the sections and extending over the hinge joint and therebeyond to wheel the case when the sections are spread apart, said handle having case retaining means engaging said sections and holding them spread apart when the handle is so secured to said hinge mechanism.

2. The invention as defined in claim 1 characterized in that the hinge mechanism which connects the case sections together for swingable movement comprises a plurality of hinges each of which includes a rigid link having its opposite ends pivotally connected with the complementary case sections to permit relative swinging movement of said sections, and the handle is secured to certain of said rigid links.

3. A combination golf cart and carrying case comprising a pair of complementary carrying case sections each provided interiorly with golf club supporting racks; hinge mechanism connecting the case sections together for swingable movement of the sections between a face-to-face closed position and a spread apart open position; a wheel assembly for each case section having a rotatably supported ground-engaging wheel, said wheel assembly coupled by linkage with its section to be swung between an inoperative position alongside of the section and substantially within the thickness thereof on the outer side to an operative position projecting outwardly therefrom; said wheel assembly linkage including an axle member pivoted to its section for swingable movement within the plane thereof and a wheel support slidably mounted at one end upon said axle member for movement longitudinally thereover and rotatable movement thereabout, and an elongate handle adapted to be removably disposed between the two sections overlying the hinge mechanism when the two sections are spread apart, means operable to secure said handle in position between the two sections overlying the hinge mechanism and secured in overlying relationship thereto, and means cooperating with the handle and said sections adapted to hold the sections in spread apart position.

4. A combination golf cart and carrying case as defined in claim 3 characterized in that the golf club supporting racks are so arranged within the case sections and so constructed as to provide an intermediate rack and two end racks spaced away from opposite sides of the intermediate rack toward the ends of the case section, said racks extending transversely of the case sections, said racks provided with a series of generally aligned cutouts adapted to receive the shafts of the club, said cutouts in the several racks having portions slightly offset so that each club has its shaft slightly tensioned during seating within the three cutouts of the three racks so as to hold the club removably in place.

5. A combination golf cart and carrying case comprising a pair of complementary carrying case sections provided interiorly with golf club supporting brackets; hinge mechanism connecting the case sections together for swingable movement of the sections between a face-to-face closed position and a spread apart open position in excess of 180°, whereby opposed case sections when open and spread apart slope outwardly and downwardly from each other; a wheel assembly for each case section having a rotatably supported ground-engaging wheel, said assembly coupled with its section to be swung between an inoperative position within the section to an operative position projecting outwardly from the section and downwardly therefrom at an angle in excess of 90° to the outer surface thereof when the sections are spread apart, and a handle adapted to be releasably secured to and between the two sections to wheel the cart and to hold the two sections spread apart at an angle in excess of 180°.

6. A combination golf cart and carrying case comprising: a pair of complementary case sections hingedly connected together for swingable movement between closed and open positions; means for releasably locking said case sections together in closed face-to-face relation; means for releasably locking said two sections in spread apart relationship; a wheel compartment in each case section; a wheel assembly positioned in each compartment, each wheel assembly including a wheel support, a wheel rotatably mounted at one end of said support, a mounting bracket secured to the case section, an axle shaft pivoted at one end to said bracket and support and pivotally secured to the bracket and extending slidably through the end of the support opposite said wheel, and wheel locking means operable to lock the assembly with the wheel in ground-engaging position.

7. A combination golf cart and carrying case comprising: a pair of complementary case sections adapted to contain golf clubs, said case sections hingedly connected together; wall means in each section defining a compartment; a wheel assembly mounted in each compartment, each wheel assembly including a wheel supporting member, a wheel rotatably mounted on an axle projecting transversely from one end of the supporting member, a mounting bracket secured to the case section within the compartment, an axle shaft pivotally secured at one end to the bracket and rotatably and linearly slidably received within the end of the wheel support opposite said wheel to permit movement of the wheel and support from a position disposed within said compartment to a ground-engaging position of the wheel remote from said case section, and locking means operable to releasably secure said wheel in its ground-engaging position.

8. The invention as defined in claim 7 characterized in that said wheel locking means includes a stationary L-shaped bar projecting from said bracket to partially embrace said wheel support and a spring-biased dog pivotally supported on said bracket to engage a side of said wheel support opposite said bar when the wheel is in ground-engaging position.

9. A combination golf cart and carrying case comprising: a pair of complementary case sections adapted to contain golf clubs, said case sections hingedly connected together; wall means in each section defining a compartment; a wheel assembly mounted in each compartment, each wheel assembly including a wheel supporting member, a wheel rotatably mounted on an axle projecting transversely from one end of the supporting member, a mounting bracket secured to the case section within the compartment, an axle shaft pivotally secured at one end to the bracket and rotatably and linearly slidably received within the end of the wheel support opposite said wheel to permit movement of the wheel and support from a position disposed within said compartment to a ground-engaging position of the wheel remote said case section, and locking means operable to releasably secure said wheel in its ground-engaging position, and means operable to retain the wheel, wheel support and axle shaft within the compartment when moved thereinto.

10. A combination golf cart and carrying case comprising a pair of complementary carrying case sections provided interiorly with golf club supporting brackets; hinge mechanism connecting the case sections together for swingable movement of the sections between a face-to-face closed position and a spread apart open position; a wheel assembly for each case section having a rotatably supported ground engaging wheel, said wheel assembly coupled with its section to be swung between an inoperative position alongside of the section to an operative position projecting outwardly therefrom; and an elongate handle releasably secured to said hinge mechanism to wheel the case when its sections are spread apart, said handle having case retaining means holding said sections spread apart when the handle is so secured to said hinge mechanism; said case retaining means on the handle overlying a part of the hinge mechanism and secured thereto and having opposite ends engaging opposed case sections when the handle is secured to the hinge mechanism holding said sections spread apart.

11. A combination golf cart and carrying case comprising a pair of complementary carrying case sections provided interiorly with golf club supporting brackets; hinge mechanism connecting the case sections together for swingable movement of the sections between a face-to-face closed position and a spread apart open position; a wheel assembly for each case section having a rotatably supported ground engaging wheel, said wheel assembly coupled with its section to be swung between an inoperative position along side of the section to an operative position projecting outwardly therefrom; and an elongate handle releasably secured to said hinge mechanism to wheel the case when its sections are spread apart, said handle having case retaining means holding said sections spread apart when the handle is so secured to said hinge mechanism, said hinge mechanism which connects the case sections together for swingable movement comprising a plurality of hinges each of which includes a rigid link having its opposite ends pivotally connected with complementary case sections and adapted to hold said complementary case sections apart when the sections are spread apart to the open position; said handle provided with a plate-like member which overlies a face of said rigid link and means carried by the handle extending through said plate-like member and engaging the rigid link of the hinge to secure the handle thereto.

12. A combination golf cart and carrying case comprising a pair of complementary carrying case sections provided interiorly with golf club supporting brackets; hinge mechanism connecting the case sections together for swingable movement of the sections between a face-to-face closed position and a spread apart open position; a wheel assembly for each case section having a rotatably supported ground engaging wheel, said wheel assembly coupled with its section to be swung between an inoperative position alongside of the section to an operative position projecting outwardly therefrom; and an elongate handle releasably secured to said hinge mechanism to wheel the case when its sections are spread apart, said handle having case retaining means holding said sections spread apart when the handle is so secured to said hinge mechanism, said hinge mechanism including a plurality of spaced apart hinges and the handle including a part engageable with one of said hinges to removably position the handle with respect thereto, and a threaded stud projecting rotatably through the handle and threadedly engageable with another of said hinges to secure said handle to said hinge and hold it in position with respect to the first mentioned hinge when the case is in open position.

References Cited by the Examiner

UNITED STATES PATENTS

| | | | |
|---|---|---|---|
| 2,726,874 | 12/55 | Sullivan | 280—37 |
| 2,837,346 | 6/58 | Chambless | 280—37 |

ARTHUR L. LA POINT, *Primary Examiner.*